(12) United States Patent
Kalteis

(10) Patent No.: US 10,760,979 B2
(45) Date of Patent: Sep. 1, 2020

(54) METHOD FOR CALIBRATING A TEMPERATURE SENSOR LOCATED IN A PROCESS OF AUTOMATION TECHNOLOGY

(71) Applicant: Endress+Hauser Wetzer GmbH+Co. KG, Nesselwang (DE)

(72) Inventor: Helmut Kalteis, Marktoberdorf (DE)

(73) Assignee: Endress+ Hauser Wetzer GmbH+ Co. KG, Nesselwang (DE)

( * ) Notice: Subject to any disclaimer, the term of this patent is extended or adjusted under 35 U.S.C. 154(b) by 237 days.

(21) Appl. No.: 15/758,451

(22) PCT Filed: Aug. 26, 2016

(86) PCT No.: PCT/EP2016/070171
§ 371 (c)(1),
(2) Date: Mar. 8, 2018

(87) PCT Pub. No.: WO2017/045895
PCT Pub. Date: Mar. 23, 2017

(65) Prior Publication Data
US 2018/0252598 A1    Sep. 6, 2018

(30) Foreign Application Priority Data
Sep. 15, 2015    (DE) .......................... 10 2015 115 535

(51) Int. Cl.
*G01K 15/00*    (2006.01)
*G01K 13/02*    (2006.01)
(Continued)

(52) U.S. Cl.
CPC ............. *G01K 15/005* (2013.01); *G01K 7/02* (2013.01); *G01K 7/16* (2013.01); *G01K 13/02* (2013.01)

(58) Field of Classification Search
CPC .......... G01K 15/005; G01K 7/02; G01K 7/16; G01K 13/02
See application file for complete search history.

(56) References Cited

U.S. PATENT DOCUMENTS 5,195,826 A * 3/1993 Enderle ................ G01B 5/0014
33/560
5,689,447 A    11/1997 Ward
(Continued)

FOREIGN PATENT DOCUMENTS

CN    103154686 A    6/2012
CN    102803912 A    11/2012
(Continued)

OTHER PUBLICATIONS

English Machine Translation of EP1102048A1; to Baerts; May 23, 2001; all pages (Year: 2001).*
(Continued)

*Primary Examiner* — Lisa M Caputo
*Assistant Examiner* — Philip L Cotey
(74) *Attorney, Agent, or Firm* — Kelly J. Smith; PatServe

(57) ABSTRACT

The application discloses a method for calibrating a temperature sensor located in a process of automation technology, wherein the calibration method comprises method steps as follows: specifying or ascertaining a temperature measuring range, which is passed through in the process of automation technology; specifying or ascertaining a reference temperature arising in the temperature measuring range; determining temperature measured values by means of the temperature sensor; detecting whether temperature measured values are at least approximately constant in the temperature measuring range during a specified time span;
(Continued)

correcting the at least approximately constant, measured value of temperature in the temperature measuring range to the reference temperature.

10 Claims, 2 Drawing Sheets

(51) Int. Cl.
  *G01K 7/02* (2006.01)
  *G01K 7/16* (2006.01)

(56) References Cited

U.S. PATENT DOCUMENTS

| | | | | |
|---|---|---|---|---|
| 8,231,266 | B2* | 7/2012 | Schulze | G01K 15/00 |
| | | | | 374/1 |
| 8,851,744 | B1 | 10/2014 | Feller | |
| 9,429,483 | B2* | 8/2016 | Engelstad | G01K 1/14 |
| 2009/0201968 | A1 | 8/2009 | Schulze | |
| 2010/0316086 | A1* | 12/2010 | Engelstad | G01K 1/14 |
| | | | | 374/1 |
| 2012/0051389 | A1* | 3/2012 | Schalles | G01K 15/002 |
| | | | | 374/1 |
| 2013/0022075 | A1* | 1/2013 | Pape | G01K 7/30 |
| | | | | 374/1 |
| 2014/0112368 | A1* | 4/2014 | Engelstad | G01K 1/14 |
| | | | | 374/1 |
| 2014/0230519 | A1* | 8/2014 | Kleiner | G01F 25/0053 |
| | | | | 73/1.16 |
| 2016/0169704 | A1* | 6/2016 | Badeja | G01D 3/036 |
| | | | | 73/866.1 |
| 2016/0370795 | A1* | 12/2016 | Musselman | G01K 15/005 |
| 2018/0217010 | A1* | 8/2018 | Umkehrer | G01K 15/005 |
| 2018/0224338 | A1* | 8/2018 | Umkehrer | G01K 7/16 |
| 2018/0328765 | A1* | 11/2018 | Heitz | G01D 18/006 |

FOREIGN PATENT DOCUMENTS

| | | |
|---|---|---|
| CN | 105509928 A | 4/2016 |
| DE | 10254444 A1 | 6/2004 |
| DE | 102005019588 A1 | 11/2006 |
| DE | 102010040039 A1 | 3/2012 |
| DE | 102013222316 A1 | 5/2015 |
| EP | 1102048 A1 | 5/2001 |
| EP | 1247268 B2 | 8/2009 |
| EP | 2440897 A2 | 12/2010 |
| EP | 2440897 A2 | 4/2012 |
| JP | 2009115597 A | 5/2009 |

OTHER PUBLICATIONS

Search Report for German Patent Application No. 10 2015 115 535.4, German Patent Office, dated May 13, 2016, 6 pp.
Search Report for International Patent Application No. PCT/EP2016/070171, WIPO, dated Aug. 26, 2016, 11 pp.

* cited by examiner

METHOD FOR CALIBRATING A TEMPERATURE SENSOR LOCATED IN A PROCESS OF AUTOMATION TECHNOLOGY

CROSS-REFERENCE TO RELATED APPLICATIONS

The present application is related to and claims the priority benefit of German Patent Application No. 10 2015 115 535.4, filed on Sep. 15, 2015 and International Patent Application No. PCT/EP2016/070171 filed on Aug. 26, 2016, the entire contents of which are incorporated herein by reference.

TECHNICAL FIELD

The invention relates to a method for calibrating a temperature sensor located in a process of automation technology. A calibrating in the process is also referred to as in situ calibrating. Furthermore, the invention relates to a temperature measuring apparatus, which is suitable for performing the calibration method.

BACKGROUND

Temperature sensors are used in automation technology in the most varied of applications. A large number of different temperature sensors are produced and sold by the applicant. Often, temperature sensors are secured on a container wall (tube, or pipe, wall, tank wall) in such a manner that the temperature sensitive component of the temperature sensor is in thermal contact with a process-located medium, whose temperature is to be determined or monitored.

A basic problem for a stable and reliable temperature measurement is drift of the temperature sensors. This drift means that the temperature sensors have to be calibrated in certain time intervals. In such case, the time intervals between the calibrations are strongly dependent on the particular embodiment of the temperature sensor and the conditions, which reign at the location of use of the temperature sensor in the process.

For purposes of the calibration, a temperature sensor must usually be deinstalled and brought in contact with a suitable calibration medium of defined temperature, e.g. ice water. If the temperature value of the temperature sensor measured in the calibration medium deviates from the known reference temperature of the calibration medium, then the measured temperature value is corrected to the reference temperature. The deinstallation of the temperature sensor is problematic, since it often makes an interruption of the process necessary—and a shutdown of a plant is usually connected with costs for the plant operator. Additionally, in the case of the deinstallation, a sealed connection between temperature sensor and container wall is opened and must subsequently be re-created.

Known from patent EP 1247268 B2 is an in situ calibrating with a number of integrated temperature sensors. Installed in a measuring insert is, supplementally to a primary temperature sensor, one or more reference temperature sensors. A reference temperature sensor differs as regards construction and utilized materials from the primary temperature sensor. Apart from the fact that, in the case of the known solution, a number of temperature sensors must be applied, in the case of a reference temperature sensor, aging effects and characteristic line drifts can occur, which deviate from those of the primary temperature sensor. Thus, according to an embodiment, used in parallel with a primary Pt100 resistance sensor as reference temperature sensors are semiconductor temperature sensors—so-called NTC/PTC resistors. In order that the temperature measurement work reliably in the case of the known solution, the characteristic lines and the aging characteristics of the reference temperature sensors must be known very exactly; at least, however, the characteristic line changes of the reference temperature sensors must be lower than in the case of the primary temperature sensor to be monitored.

Known from DE 10 2010 040 039 A1 is a temperature sensor with a reference element. The reference element is composed partially of a ferroelectric material. Ferroelectric materials experience a phase transformation at a certain, defined temperature value (Curie temperature). As a result of the phase transformation, the electrical conductivity changes abruptly. If the known temperature sensor is working in a temperature range, in which the phase transformation occurs, then this can be detected and the measured temperature value, in the case of a deviation, is calibrated, i.e. corrected, to the certain, defined temperature. From the preceding description, it can be seen that the known in situ calibration solutions only function with specially manufactured temperature sensors.

SUMMARY

An object of the invention is to provide a method, which enables calibrating any conventional temperature sensor in situ.

The object is achieved by a calibration method, which comprises method steps as follows:

specifying or ascertaining a temperature measuring range, which is passed through in the process of automation technology;

specifying or ascertaining a reference temperature arising in the temperature measuring range;

determining temperature measured values by means of the temperature sensor;

detecting whether temperature measured values are at least approximately constant in the temperature measuring range during a predetermined time span;

correcting the at least approximately constant, measured value of temperature in the temperature measuring range to the reference temperature.

The solution of the invention enables, thus, conducting a reliable in situ calibrating via specification of just a few parameters. These variables in the simplest case are:

a temperature range, which occurs in the relevant process of automation technology;

a reference temperature within such temperature range;

a duration, after which one can be sure that the temperature sensor has at least approximately achieved an equilibrium state within the temperature range.

The more exact the above specifications, the more reliable is the time stable accuracy of measurement of the temperature sensor. The specifications result from the processes experienced by the plant and are transmitted via an input unit of the control/evaluation unit of the temperature sensor. Alternatively, the needed parameters can also be ascertained at least partially from the temperature sensor. For this, the temperature measured values are plotted and searched for cyclic changes. Preferably, this ascertainment phase occurs after installation of the calibrated temperature measuring apparatus in the process.

Especially advantageous, naturally, is when the specified or ascertained temperature measuring range is passed through recurringly in the process of automation technology.

In the case of almost all processes, which are performed in automation technology, times, in which the temperature is kept at almost constant values, are usually part of any process. The following are a few examples, which play a large role in process automation technology. Of course, the solution of the invention is not limited to these mentioned processes.

Recurring sterilization processes (also known as SIP processes—Sterilization In Place) of a plant are especially indispensable in the foods industry for hygienic reasons. Legal specifications control both the temperature, in the case of which the sterilization must occur, as well as also the time span, during which the plant must be sterilized.

Recurring cleaning processes (CIP processes—Cleaning In Place), in the case of which a cleaning agent of a defined temperature flows through the plant.

Recurring turning the plant off, e.g. after end of work, wherein the reference temperature is, for example, the temperature of the air-conditioned room air.

Recurring heating—and cooling cycles in the plant, etc.

The temperature measuring apparatus of the invention, which is suitable for performing the calibration method of the invention, is composed of a temperature sensor and a control/evaluation unit. The temperature sensitive element of the temperature sensor can be a resistance sensor (e.g. of platinum) in the form of a wire, a thin film sensor, a thick film sensor or a wire winding. Likewise, the temperature sensitive element of the temperature sensor can be a thermocouple. Usually, the aforementioned temperature sensitive elements are embedded in a potting compound or in a powder and affixed in a measuring tube. This combination is usually referred to as a measuring insert. Depending on location of use of the temperature sensors, these measuring inserts are arranged in a protective tube of metal and insulated therefrom via an insulation layer. The control/evaluation unit is so embodied that it monitors the current temperature measured value, and, indeed, at least then, when the temperature measured value of the temperature sensor lies within the stated temperature measuring range and is at least approximately constant for the predetermined time span. If the currently measured temperature value, or the average value of the measured temperature values lies during the predetermined time span outside of the tolerance range of the specified reference temperature, then the correction to the reference temperature occurs, and the temperature sensor is calibrated in situ.

BRIEF DESCRIPTION OF THE DRAWINGS

The invention will now be explained in greater detail based on the appended drawing, the figures of which show as follows.

DETAILED DESCRIPTION

Figure 1:
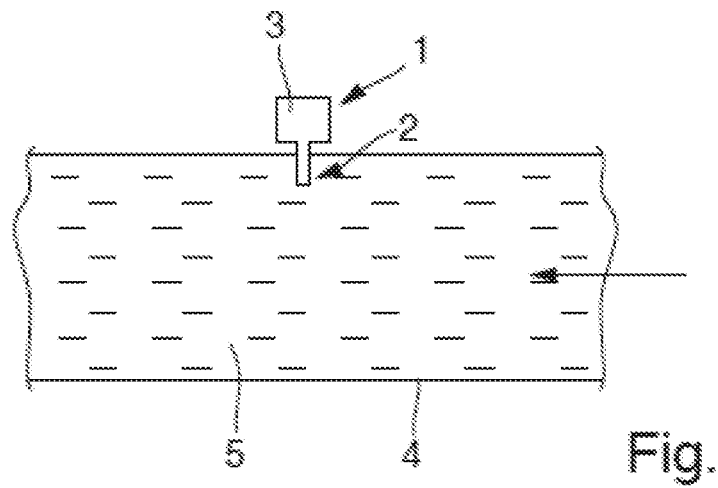
FIG. 1 shows a schematic representation of an in situ calibratable temperature measuring device of the invention located in a process.

FIG. 1 is a schematic representation of an in situ calibratable temperature measuring device 1 of the invention located in a process. In the illustrated case, the temperature measuring device 1 determines the temperature T of a medium 5, which is flowing through a pipeline 4 in the direction of the arrow. The temperature measuring device 1 is composed of a temperature sensor 2 (with a temperature sensitive element) and a control/evaluation unit 3. While the temperature sensor 2 is in thermal contact with the medium 5, the control/evaluation unit 3 is arranged removed from the pipeline 4—and, thus, removed from the actual process. Medium 5 is any fluid medium. Examples of temperature sensitive elements and corresponding temperature sensors 2 have already been mentioned non-exclusively above. A large number of temperature measuring devices 1 are produced and sold by the applicant for use in the most varied of applications of automation technology. In general, known temperature sensors 2 are referred to in connection with the invention as conventional temperature sensors. The in situ calibration method of the invention is suitable for all conventional temperature sensors 2.

Figure 2:
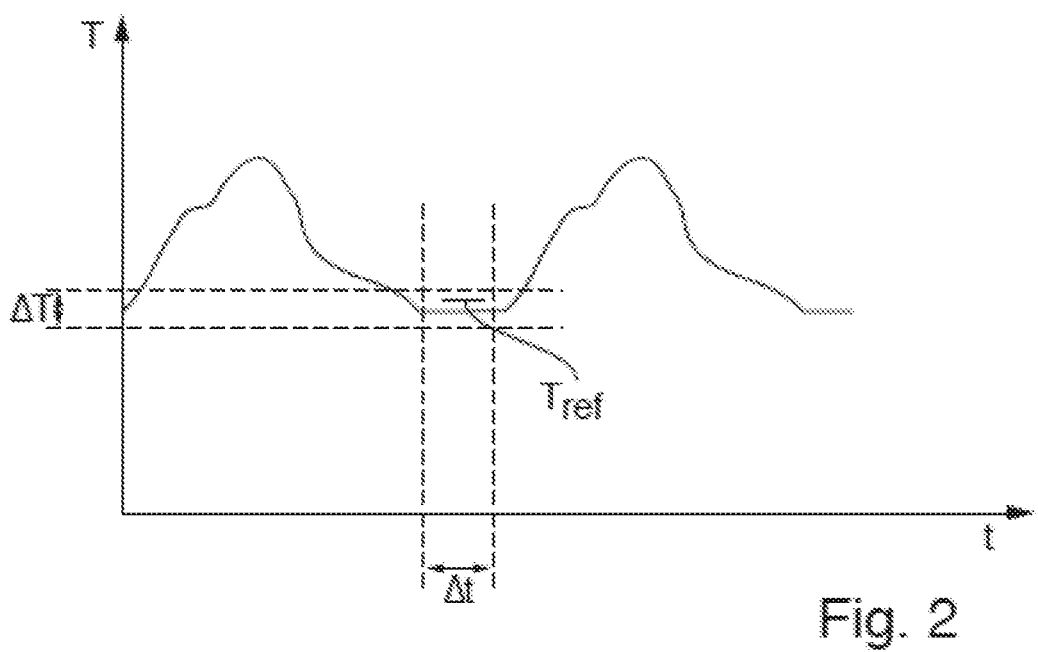
FIG. 2 shows a schematic representation of temperature as a function of time in a process of automation technology.

FIG. 2 shows schematically the temperature curve of the medium 5, which flows through the pipeline 4 shown in FIG. 1. A large number of other applications, in which temperature sensors 2 are applied in automation technology, is best known from the state of the art. In all applications, in the case of which information concerning the temperature T must be provided, naturally also the accuracy of measurement of the temperature measuring devices 1 plays an important role. In order to compensate aging—or process related drifting of the temperature sensors 2 and therewith to deliver an increased accuracy of measurement, the method of the invention is applied preferably in recurring cycles.

Figure 3:
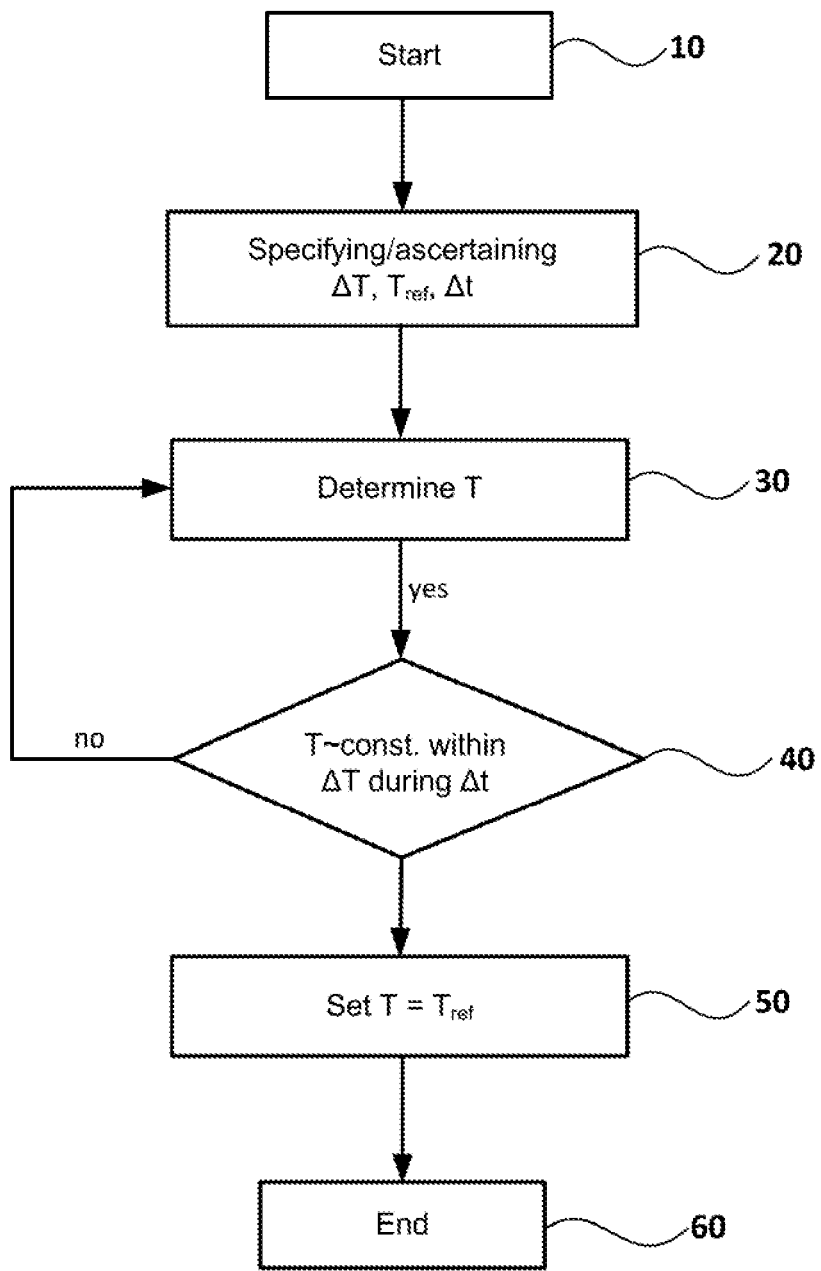
FIG. 3 shows a flow diagram, which describes an advantageous embodiment of the method of the invention.

FIG. 3 shows a flow diagram, which illustrates an advantageous embodiment of the in situ calibration method of the invention. After the program start at point 10, at program point 20, the following parameters or variables are specified:

the temperature measuring range $\Delta T$, which is relevant for the particular process and which is passed through preferably recurringly in the process of automation technology;

the reference temperature $T_{ref}$, which occurs in the temperature measuring range $\Delta T$ and to which, in given cases, temperature is to be corrected;

the time span $\Delta t$, during which the temperature T in the temperature measuring range $\Delta T$ should be at least approximately constant.

At program point 30, the temperature measured values T in the process are determined. At point 40, it is checked and detected, whether the temperature measured values T in the temperature measuring range $\Delta T$ are at least approximately constant during a specified time span $\Delta t$. If this condition is fulfilled, then at program point 50 the temperature measured value T is corrected to the specified reference temperature $T_{ref}$. If this condition is not fulfilled, then the program jumps in a loop back to the program point 30. The loop is passed through until the condition is fulfilled and the calibration is performed at program point 50. Then the program ends at program point 60.

As indicated above, the parameters, temperature measuring range $\Delta T$, time span $\Delta t$ and also the reference temperature $T_{ref}$ can also be ascertained from the particular process. For this, after installation of the (pre-calibrated) temperature sensor 2, or the (pre-calibrated) temperature measuring device 1, the temperature T is ascertained over a time range, wherein a number of cyclically repeating, possible lengths of time $\Delta t$ should fall in the time range. For example, the values for the three parameters are ascertained via an averaging of the cyclically repeating lengths of time $\Delta t$.

The invention claimed is:
1. A method for calibrating a temperature sensor in a process of automation technology, wherein the calibration method comprises method steps as follows:
   ascertaining at least one variable for calibrating the temperature sensor during the process from the temperature sensor, which is to be calibrated, by measuring the temperature of the process for at least one cycle of the process after installation of the temperature sensor in the process, wherein the variables are a temperature measuring range, a reference temperature and a time span;
   specifying the temperature measuring range, which is passed through in the recurring process of automation technology;
   specifying the reference temperature arising in the temperature measuring range;
   specifying the time span, during which the temperature measured values plateau in the temperature measuring range;
   determining temperature measured values using the temperature sensor;
   detecting whether temperature measured values plateau in the temperature measuring range during the specified time span; and
   correcting the measured value of temperature in the temperature measuring range to the reference temperature.

2. The method of claim 1, wherein the temperature sensor in the process of automation technology is subjected to a recurring sterilization- or cleaning process, wherein the sterilization- or cleaning process is performed at a defined reference temperature.

3. The method of claim 1, wherein the process of automation technology is recurringly interrupted, wherein during the duration of the interruption a specified reference temperature is present in the vicinity of the temperature sensor.

4. The method of claim 1, wherein the calibration method of the temperature sensor can be activated or deactivated.

5. A temperature measuring apparatus comprising a temperature sensor in a process of automation technology, and a control/evaluation unit for performing the following method:
   ascertaining at least one variable for calibrating the temperature sensor during the process from the temperature sensor, which is to be calibrated, by measuring the temperature of the process for at least one cycle of the process after installation of the temperature sensor in the process, wherein the variables are a temperature measuring range, a reference temperature and a time span;
   specifying the temperature measuring range, which is passed through in the recurring process of automation technology;
   specifying the reference temperature arising in the temperature measuring range;
   specifying the time span, during which the temperature measured values plateau in the temperature measuring range;
   determining temperature measured values by using of the temperature sensor;
   detecting whether temperature measured values plateau in the temperature measuring range during the specified time span; and
   correcting the measured value of temperature in the temperature measuring range to the reference temperature.

6. The temperature measuring apparatus of claim 5, wherein the temperature sensor is a platinum resistor, which is affixed in a measuring tube via a potting compound or a powder.

7. The temperature measuring apparatus of claim 5, wherein the temperature sensor is a thin film sensor, a thick film sensor or a wire wound temperature sensor, which is affixed in a measuring tube via a potting compound or a powder.

8. The temperature measuring apparatus of claim 5, wherein the temperature sensor is a thermocouple, which is affixed in a measuring tube via a potting compound or a powder.

9. The temperature measuring apparatus of claim 5, wherein the temperature sensor has a surrounding protective tube.

10. The temperature measuring apparatus of claim 5, wherein the control/evaluation unit performs the correcting of the current temperature measured value to the reference temperature, when the temperature measured value of the temperature sensor is plateaued within the temperature measuring range and is plateaued for the specified time span.

* * * * *